(12) United States Patent
Nadarassin et al.

(10) Patent No.: US 9,774,094 B2
(45) Date of Patent: Sep. 26, 2017

(54) ANTENNA WITH SHAPED REFLECTOR(S), RECONFIGURABLE IN ORBIT

(71) Applicant: THALES, Courbevoie (FR)

(72) Inventors: Madivanane Nadarassin, Toulouse (FR); Julien Boudart, Toulouse (FR); Laurent Levert, Toulouse (FR)

(73) Assignee: THALES, Courbevoie (FR)

( * ) Notice: Subject to any disclaimer, the term of this patent is extended or adjusted under 35 U.S.C. 154(b) by 64 days.

(21) Appl. No.: 14/874,067

(22) Filed: Oct. 2, 2015

(65) Prior Publication Data

US 2016/0099504 A1    Apr. 7, 2016

(30) Foreign Application Priority Data

Oct. 3, 2014   (FR) ...................................... 14 02239

(51) Int. Cl.
*H04W 4/00*   (2009.01)
*H01Q 19/00*  (2006.01)
(Continued)

(52) U.S. Cl.
CPC ............. *H01Q 19/00* (2013.01); *H01Q 1/288* (2013.01); *H01Q 1/50* (2013.01); *H01Q 3/2635* (2013.01); *H01Q 19/10* (2013.01); *H01Q 19/13* (2013.01); *H01Q 21/06* (2013.01); *H04W 84/06* (2013.01); *H01Q 1/241* (2013.01); *H01Q 13/0258* (2013.01)

(58) Field of Classification Search
CPC .... H01Q 13/0258; H01Q 19/00; H01Q 19/10; H01Q 19/13; H01Q 1/241; H01Q 1/288; H01Q 1/50; H01Q 21/06; H01Q 3/2635; H04W 84/06

USPC ........ 455/9, 418–420, 429, 427, 431, 552.1; 343/779, 754, 915, 912, 834, 725, 765, 343/751, 756, 761, 781, 835, 840
See application file for complete search history.

(56) References Cited

U.S. PATENT DOCUMENTS 5,945,960 A * 8/1999 Luh ........................ H01Q 1/288
                                                    343/757
6,137,451 A * 10/2000 Durvasula ............ H01Q 15/147
                                                    343/779
(Continued)

FOREIGN PATENT DOCUMENTS

FR    2 755 328 A1    4/1998
FR    2 888 674 A1    1/2007

*Primary Examiner* — Babar Sarwar
(74) *Attorney, Agent, or Firm* — Baker & Hostetler LLP

(57) ABSTRACT

The antenna is provided with at least one shaped reflector and a primary radiating feed arranged in front of a reflector, which is capable of generating a primary beam with a footprint covering a nominal coverage zone. The antenna is also provided with an adjustment device for the primary beam of the primary radiating feed, whereby said adjustment device incorporates a secondary radiating array comprised of a number of elementary radiating feeds arranged around the primary radiating feed, a beam-forming network connected to the elementary radiating feeds which is capable of synthesizing a secondary beam covering a secondary coverage zone and having a footprint which is superimposed, at least partially, upon the footprint, and a coupling device connected to the primary reception chain of the primary radiating feed and the reception chain derived from the secondary radiating array.

7 Claims, 17 Drawing Sheets

(51) Int. Cl.
*H01Q 3/26* (2006.01)
*H01Q 19/10* (2006.01)
*H01Q 21/06* (2006.01)
*H01Q 1/28* (2006.01)
*H01Q 1/50* (2006.01)
*H01Q 19/13* (2006.01)
*H04W 84/06* (2009.01)
*H01Q 1/24* (2006.01)
*H01Q 13/02* (2006.01)

(56) References Cited

U.S. PATENT DOCUMENTS

| | | | | |
|---|---|---|---|---|
| 6,219,003 | B1 * | 4/2001 | Chandler | H01Q 15/148 |
| | | | | 343/779 |
| 6,678,520 | B1 * | 1/2004 | Wang | H04B 7/18513 |
| | | | | 455/13.1 |
| 6,836,658 | B1 * | 12/2004 | Sharon | H04B 7/18523 |
| | | | | 370/323 |
| 7,161,549 | B1 * | 1/2007 | Cuchanski | H01Q 1/288 |
| | | | | 343/781 CA |
| 2005/0140563 | A1 * | 6/2005 | Eom | H01Q 19/17 |
| | | | | 343/840 |
| 2008/0303736 | A1 * | 12/2008 | Leveque | H01Q 15/16 |
| | | | | 343/834 |
| 2011/0171901 | A1 * | 7/2011 | Wyler | H01Q 1/1257 |
| | | | | 455/9 |

* cited by examiner

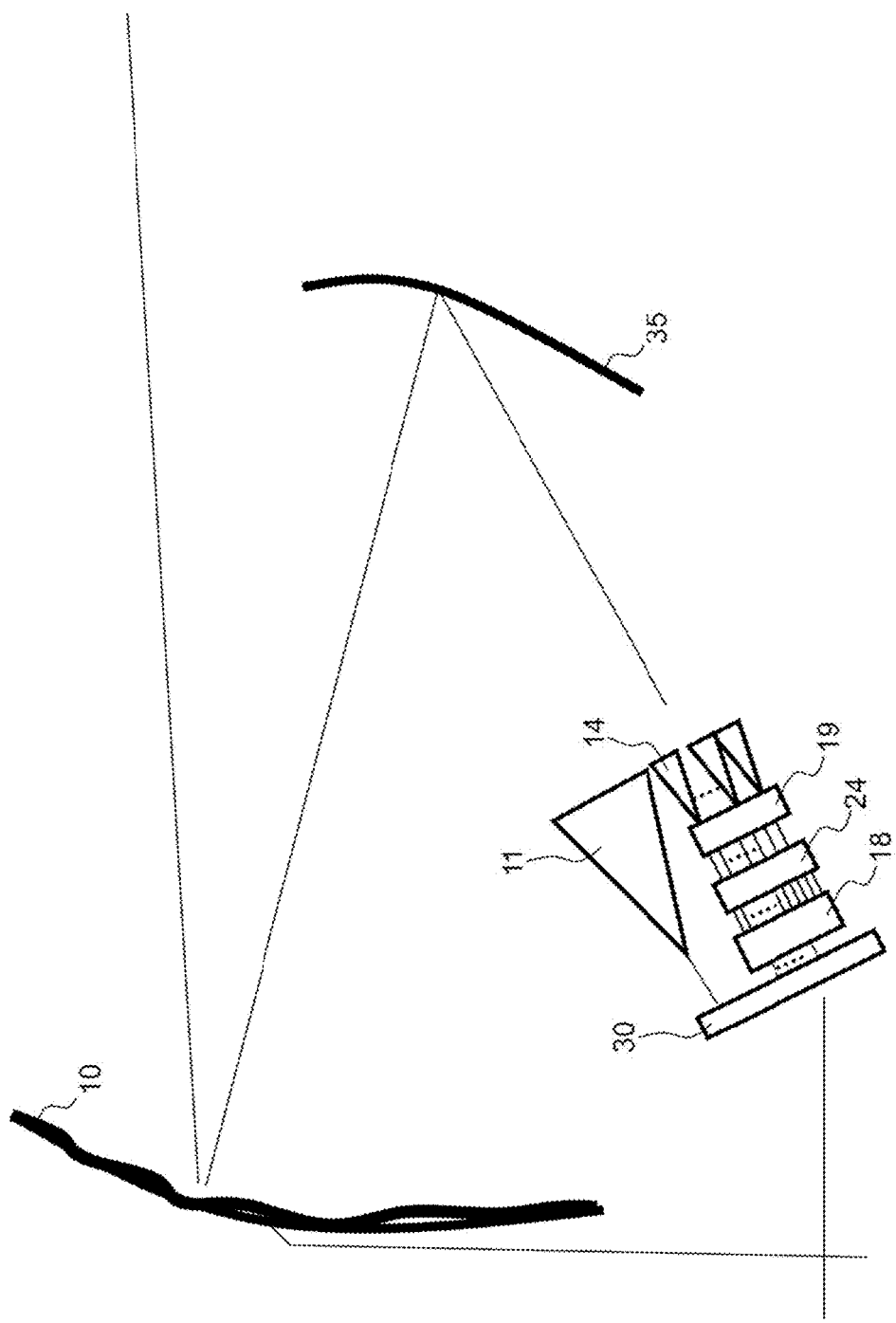

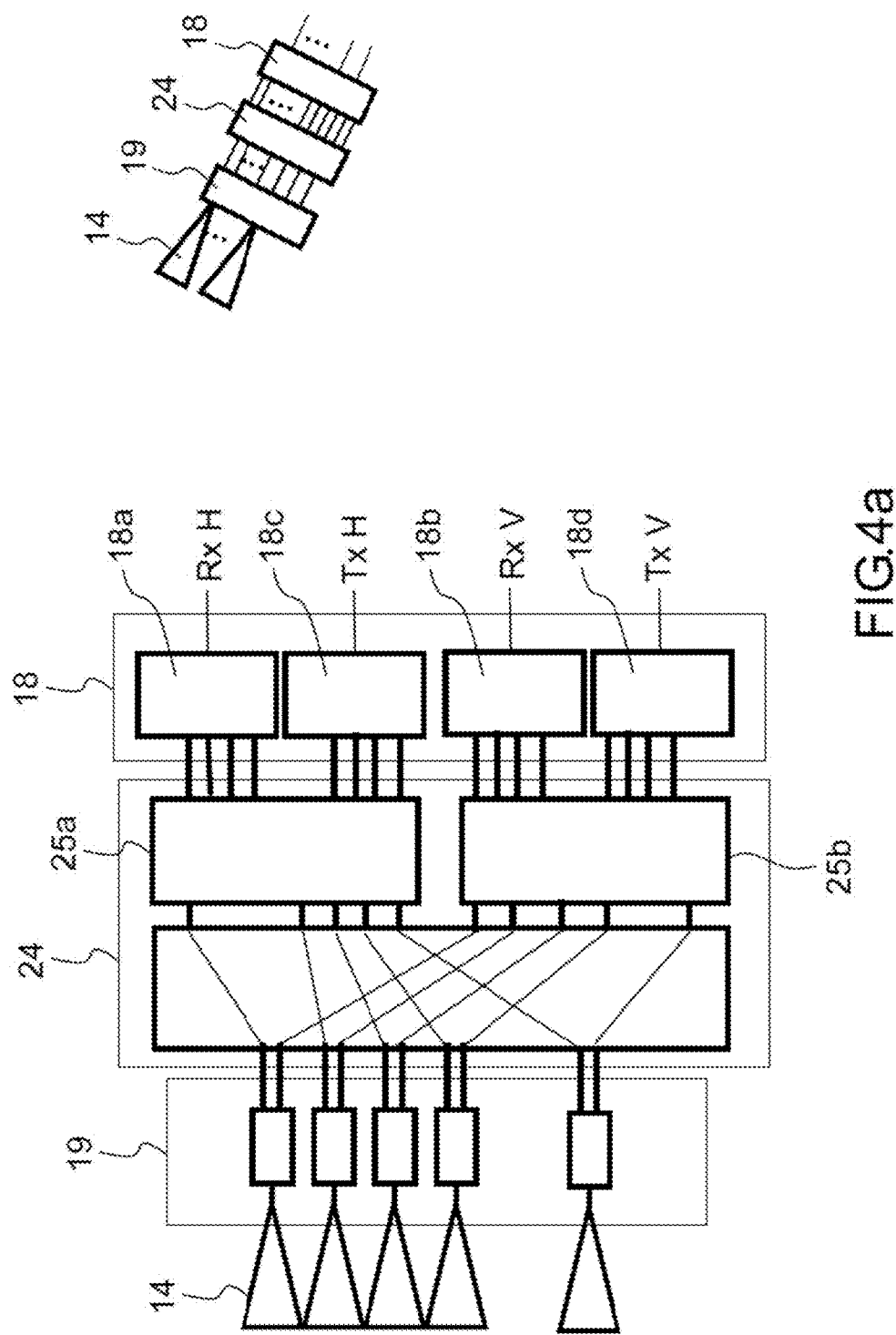

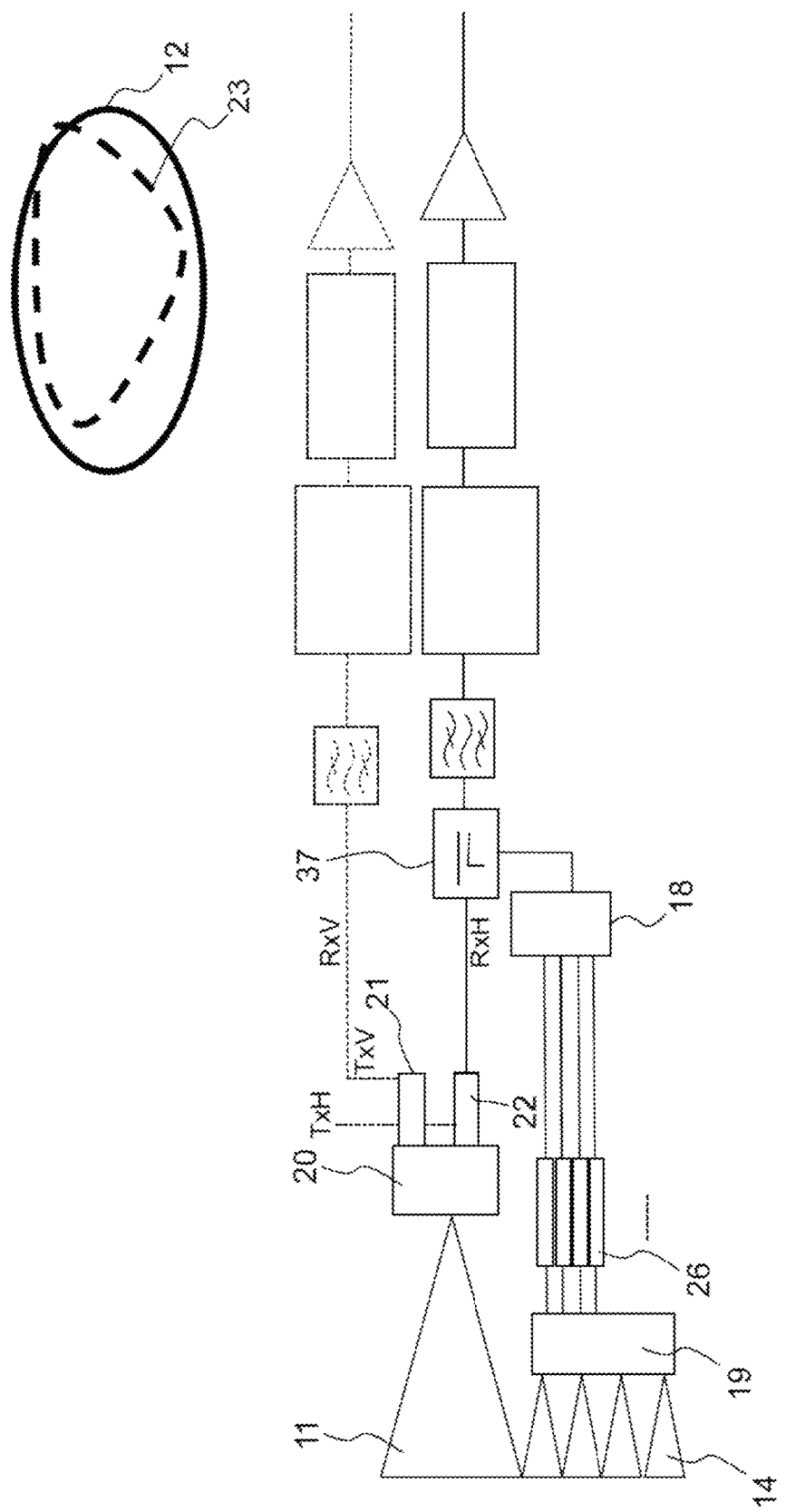

ANTENNA WITH SHAPED REFLECTOR(S), RECONFIGURABLE IN ORBIT

CROSS-REFERENCE TO RELATED APPLICATION

This application claims priority to foreign French patent application No. FR 1402239, filed on Oct. 3, 2014, the disclosure of which is incorporated by reference in its entirety.

FIELD OF THE INVENTION

The present invention relates to an antenna with shaped reflector(s) which is reconfigurable in orbit. It applies to the space industry, notably to the field of satellite telecommunications, and to any type of antenna comprising one or more shaped reflector(s).

BACKGROUND OF THE INVENTION

Telecommunication satellites are generally provided with antennae which permit the generation of one or more beams having an optimized directivity, in order to deliver a footprint which ensures the coverage of specified service zones. These service zones are generally defined and fixed at the satellite design stage, and cannot be adjusted in service during the lifetime of the satellite.

Flexible antennae are antennae which are capable of synthesizing one or more beams, whereby each beam is defined by a law of illumination which is adjustable in accordance with requirements during the service life of the satellite. The synthesis of one or more beams is achieved by the amplitude control and/or phase control of each elementary radiating feed of the antenna. The capacity for the modification of the position and the shape of the beam in orbit is particularly useful for the adjustment of the footprint in response to a change of requirements, or in order to generate a directional beam, or to ensure anti-jamming capabilities.

A first solution for the achievement of a flexible footprint could be the use of an active DRA (Direct Radiating Array) antenna. This type of antenna is not fitted with a reflector, and comprises an array of radiating feeds associated with a BFN (Beam-Forming Network), attenuators, phase shifters and amplifiers. The DRA permits the synthesis of reconfigurable beams, but requires a large number of radiating feeds and, in consequence a large number of amplitude and phase controls, thereby necessitating a substantial quantity of on-board hardware, both for the BFN and for its electronic control and regulation device. This type of antenna is therefore particularly complex and voluminous, expensive and heavy, such that its use is frequently limited to military applications.

A second solution could be the use of a FAFR (Focal Array Fed Reflector) antenna, comprised of an array of radiating feeds accommodated at the focal point of an unshaped parabolic reflector. The coverage achieved by this antenna is a direct image of the focal spot of the array shape, whereby the position of the feeds is directly linked to the shape of the area to be covered. Each feed contributes to an element of the footprint, described as a cell. Consequently, there is a direct relationship between the size in area of the footprint, also described as coverage, and the number of radiating feeds, which may become very large when very extensive coverage is required, thereby resulting in problems in the fitting-out of a satellite. This type of antenna may be suitable for applications which are restricted to certain frequency bands and ground coverage of limited size. Moreover, if these areas of ground coverage are to be adjusted, this antenna requires the extinction or activation of a certain number of feeds and thereafter, generally, a re-optimization of the laws of amplitude and/or of phase, which necessitates the use of a matrix of switches and a large number of controls. The BFN architecture is therefore particularly complex, with a consequent mass, volume and cost. Moreover, the resolution of the antenna, which is directly linked to the size of the feeds, and the reconfiguration capacity, which is directly linked to the capacity of the BFN, are limited. It is possible to reduce the complexity of this type of antenna by using a reflector with a shaped surface, which permits the expansion of the size of the elementary beams generated by each feed, and a reduction in the number of feeds required for generating a beam which ensure the ground coverage, and in the number of corresponding controls. However, the resulting antenna is still highly complex, expensive and voluminous.

Although these various known antennae feature capacities for flexibility, they all have a major disadvantage, in that they are not ideal for conventional telecommunication functions.

SUMMARY OF THE INVENTION

The object of the invention is the correction of the disadvantages of known antennae, and the realization of a flexible antenna which is simpler, less voluminous and lower in cost. More specifically, the object of the invention is the realization of an antenna which is reconfigurable in orbit, on the basis of an existing antenna with shaped reflector(s), initially optimized for generating a beam over a predefined and fixed zone of coverage, whereby said antenna is modified moreover for the generation of a flexible additional beam and/or for the achievement of flexible beam combined with the initial beam, and is suitable for use, for example, for the protection of telecommunications against jammers on uplinks between gateways and a satellite.

To this end, the invention involves the modification of the existing antenna by the addition thereto of an ancillary adjustment device for the generation of a secondary radiation diagram, and the coupling of the secondary radiation diagram, by combination or superimposition, with the primary radiation diagram of the antenna, in order to modify the radiation capacities of the antenna, such that the latter is rendered partially or completely flexible. The coupling system between the primary radiation diagram and the secondary radiation diagram may be of different types, including combination, superimposition or filtering.

According to the invention, the emitting and receiving antenna for a telecommunications satellite is provided with at least one shaped reflector and a primary radiating feed including a primary reception chain, said primary radiating feed being able to generate a primary beam with a nominal footprint. The antenna is also provided with an adjustment device for adjusting the primary beam, wherein said adjustment device incorporates a secondary radiating array composed of a number of elementary radiating feeds accommodated around the primary radiating feed, a beam-forming network connected to the elementary radiating feeds which is able to synthesize a secondary beam having a footprint which is superimposed, at least partially, upon the nominal footprint, and a coupling device connected to the primary reception chain of the primary radiating feed and to a reception chain of the secondary radiating array, said coupling device comprising at least a first filter connected to the primary radiating feed, at least a second filter connected on the output of the beam-forming network, and a dual multiplexer comprising two inputs which are connected respectively to respective outputs of the first filter and the second filter, wherein the dual multiplexer is capable of multiplexing the reception frequency bands of the primary radiating feed and of the secondary radiating array in order to reconstitute a complete and non-jammed reception frequency band.

The first filter may be a selective-rejection band-stop filter, and the second filter may be a selective band-pass filter, the selective band-stop filter and the selective band-pass filter being centered on frequencies corresponding to the emission frequencies of a jammer.

Alternatively, the first filter and the second filter may be band-pass filters covering the totality of a reception frequency band of the antenna.

The coupling device may also comprise a switch with two positions having an input connected to the primary radiating feed, said switch comprising a first output position connected to the primary reception chain, and a second output position connected to an input of the beam-forming network.

Alternatively, the coupling device may also comprise a coupler having an input connected to the primary radiating feed and provided with a first output connected to the primary reception chain and a second output connected to an input of the beam-forming network.

Advantageously, the coupler may be a variable power divider.

Advantageously, the antenna may comprise an electronic scanning control device linked to an on-board computer, said electronic scanning control device being connected to the beam-forming network.

The major advantage of this type of antenna is that it permits operation in two different modes: a conventional mode, in which the antenna delivers fixed coverage, or a completely or partially flexible mode, in which the antenna generates a flexible beam for a part of the operating frequency band of the antenna, or for the entire operating frequency band, according to requirements arising during the operational life of the satellite.

BRIEF DESCRIPTION OF THE DRAWINGS

Further characteristics and advantages of the invention will be clarified in the remainder of the description, which is provided as purely illustrative and nonlimiting example, with reference to the attached schematic drawings, which represent:

FIG. 3b: a synoptic view of an emitting and receiving device, in the case of an antenna with two reflectors, according to the invention;

FIG. 4a: a detailed block diagram of the architecture of the emitting and receiving device of the secondary radiating array shown in FIGS. 3a, 3b and 3c, according to the invention;

FIG. 7c: a block diagram of a third example of the architecture of an antenna comprising a continuous adjustment device for the primary beam which ensures the protection of gateways against jammers located in the primary coverage zone of the antenna, according to the invention;

DETAILED DESCRIPTION

Figure 1:
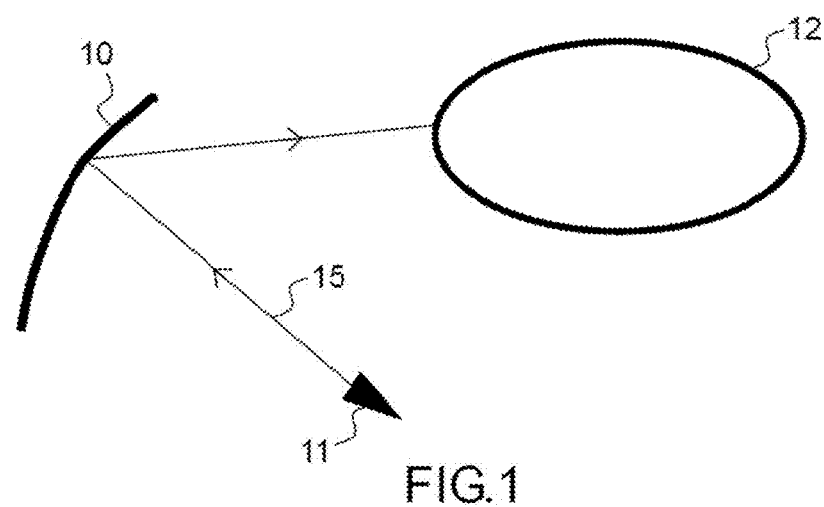
FIG. 1: a simplified schematic view of an example of an emitting and receiving antenna, according to the prior art.
Figure 5A:
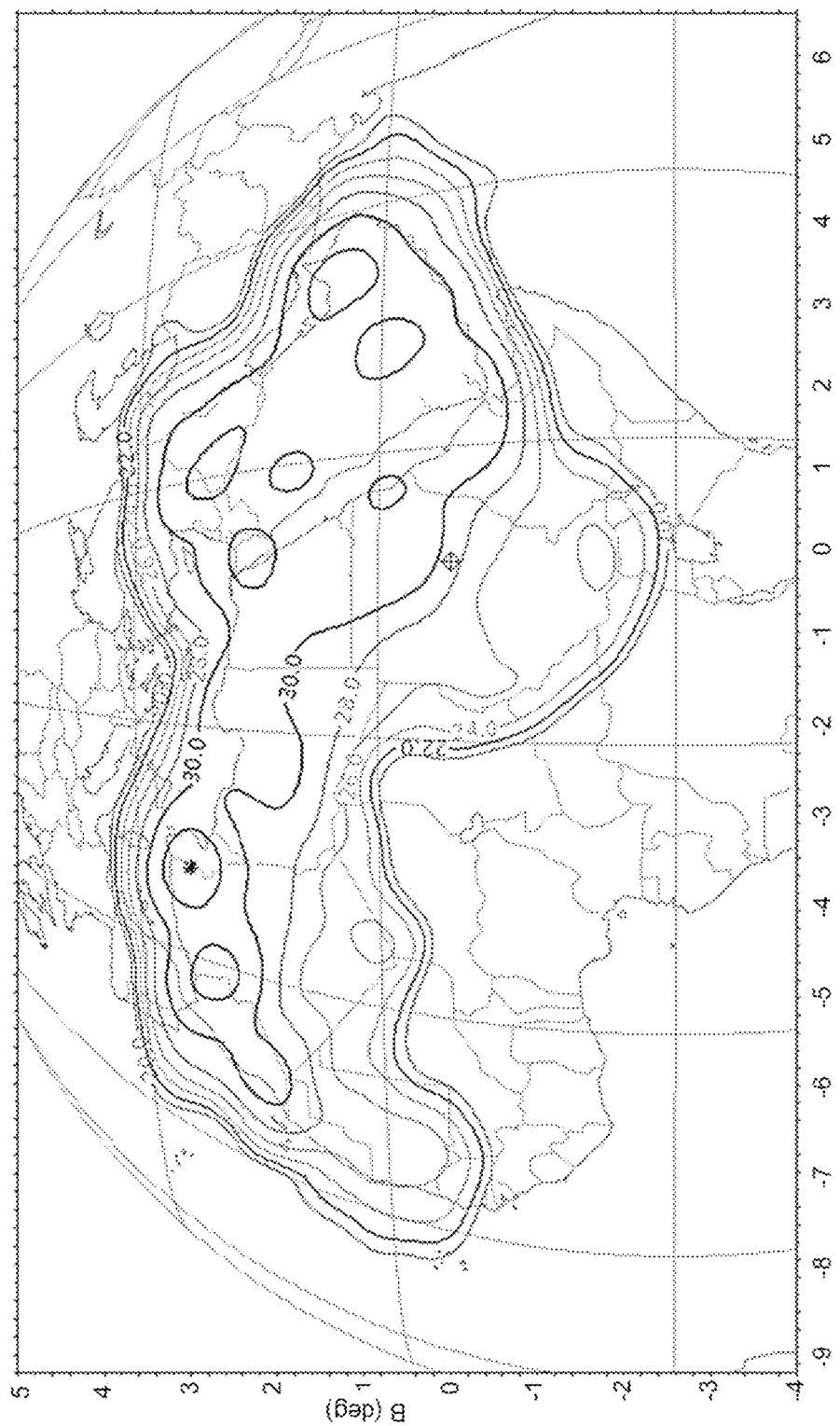
FIG. 5a: an example of the primary radiation diagram delivered by the primary radiating feed of the antenna, according to the invention.
Figure 5B:
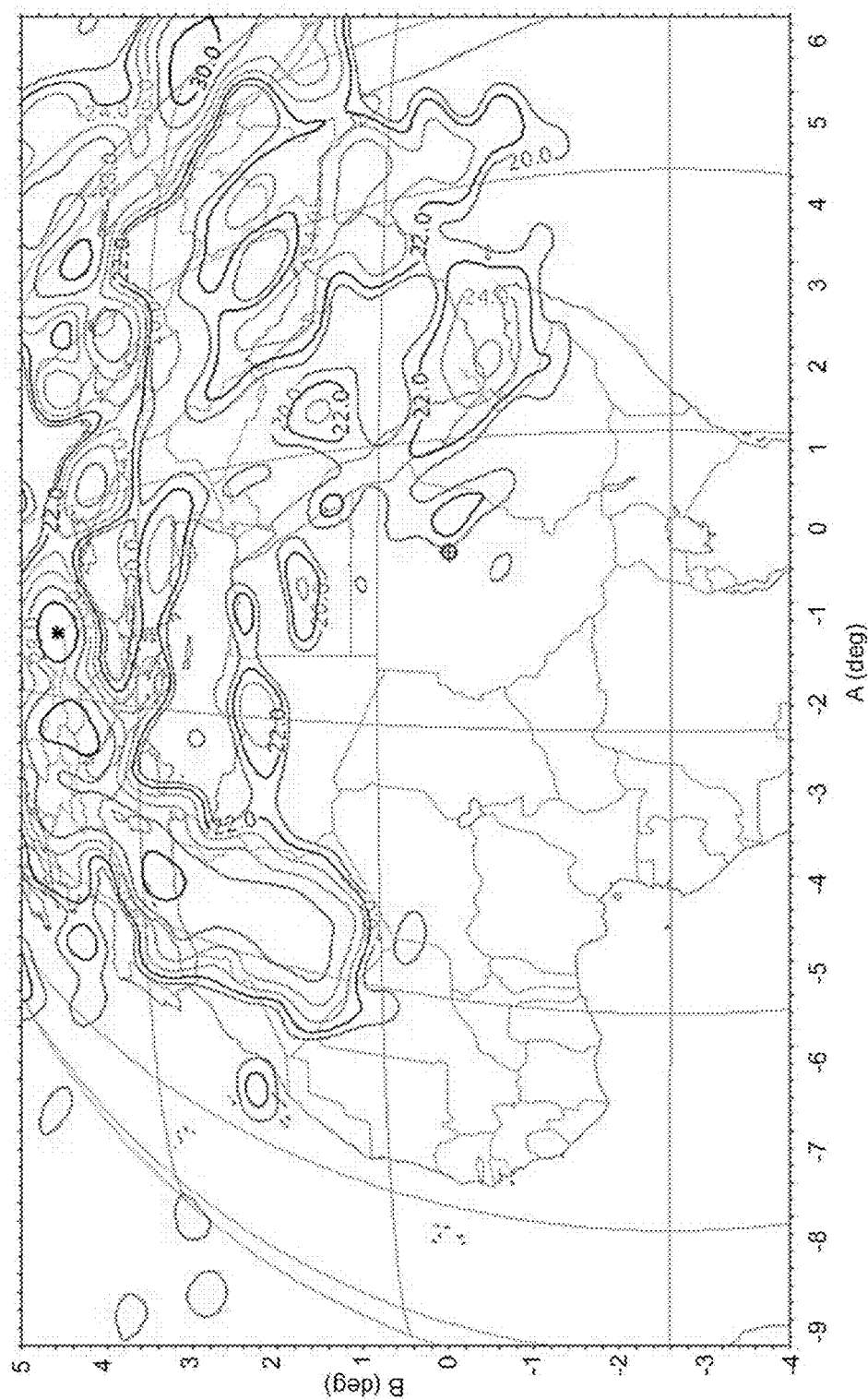
FIG. 5b: an example of the secondary radiation diagram derived from one of the elementary radiating feeds of the secondary radiating array of the antenna, according to the invention.

FIG. 1 shows a single-reflector offset antenna according to the prior art, comprising a reflector 10 and a radiating feed 11 arranged at the focal point of the reflector. The radiating feed is conventionally comprised of a radiating element, for example a feed horn, connected to an emission and reception chain. In emission mode, the radiating feed emits a beam of electromagnetic waves 15 in the direction of the reflector, which reflects the beam and generates a desired footprint 12. In reception mode, the pathway of the beams is reversed. The reflector 10 may be provided with a parabolic surface, or with a surface shaped in three dimensions. A shaped surface is characterized by the presence of hallows and bumps on different points of the surface, and permits the reflection of a beam delivered by a feed, by spreading the energy thereof in order to achieve a footprint of the desired shape and dimensions, as represented, for example, on the radiation diagram shown in FIG. 5a. However, the beam delivered by this antenna is fixed, and cannot be redefined in orbit.

Figure 2A:
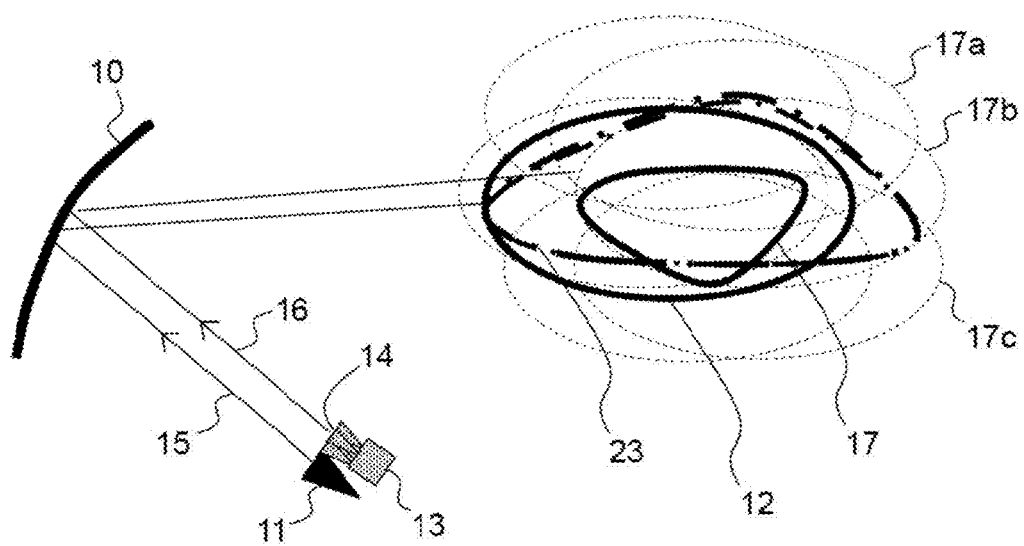
FIG. 2a: a simplified schematic view of an example of a flexible emitting and receiving antenna, according to the invention.
Figure 3A:
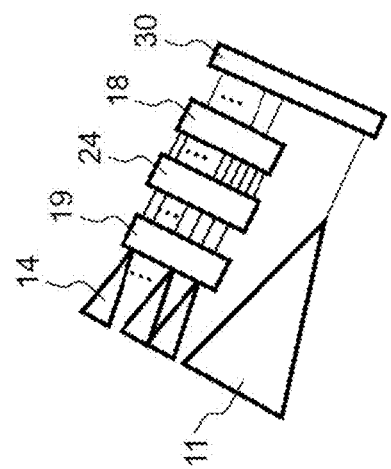
FIG. 3a: a synoptic view of an emitting and receiving device, in the case of an example of a single-reflector antenna, according to the invention.
Figure 3A:
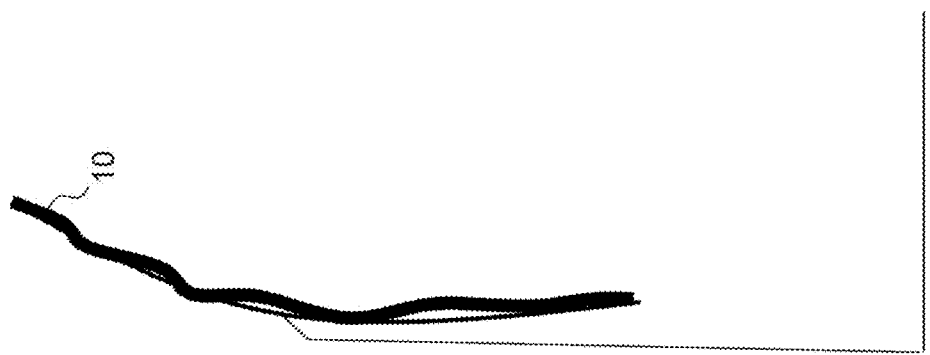
Figure 3C:
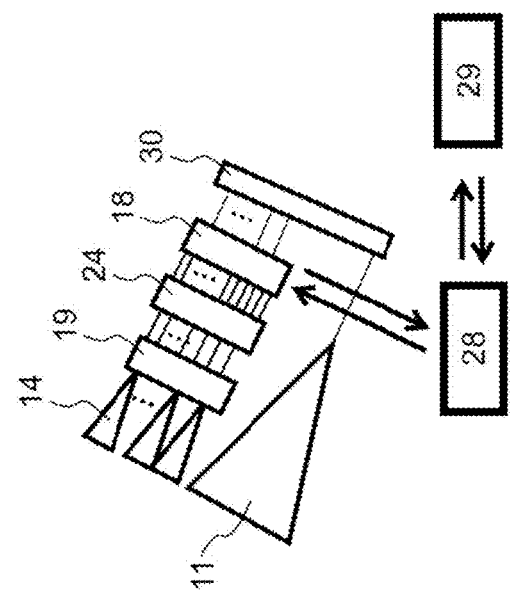
FIG. 3c: a synoptic view of an emitting and receiving device, in the case of the example of a single-reflector antenna shown in FIG. 3a, with an adjustable BFN, according to the invention.
Figure 3C:
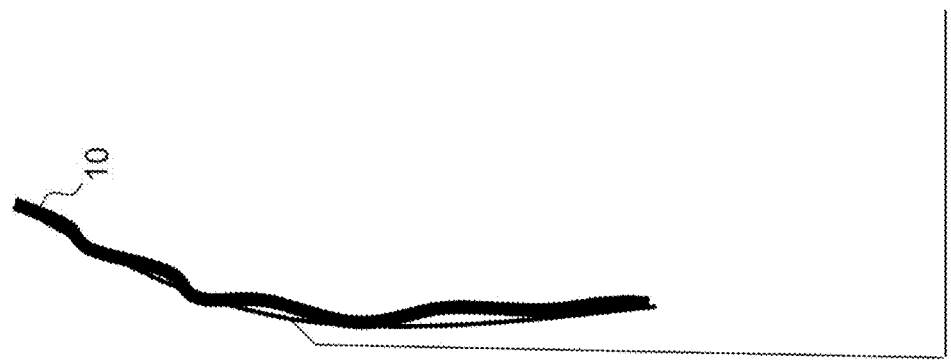
Figure 4B:
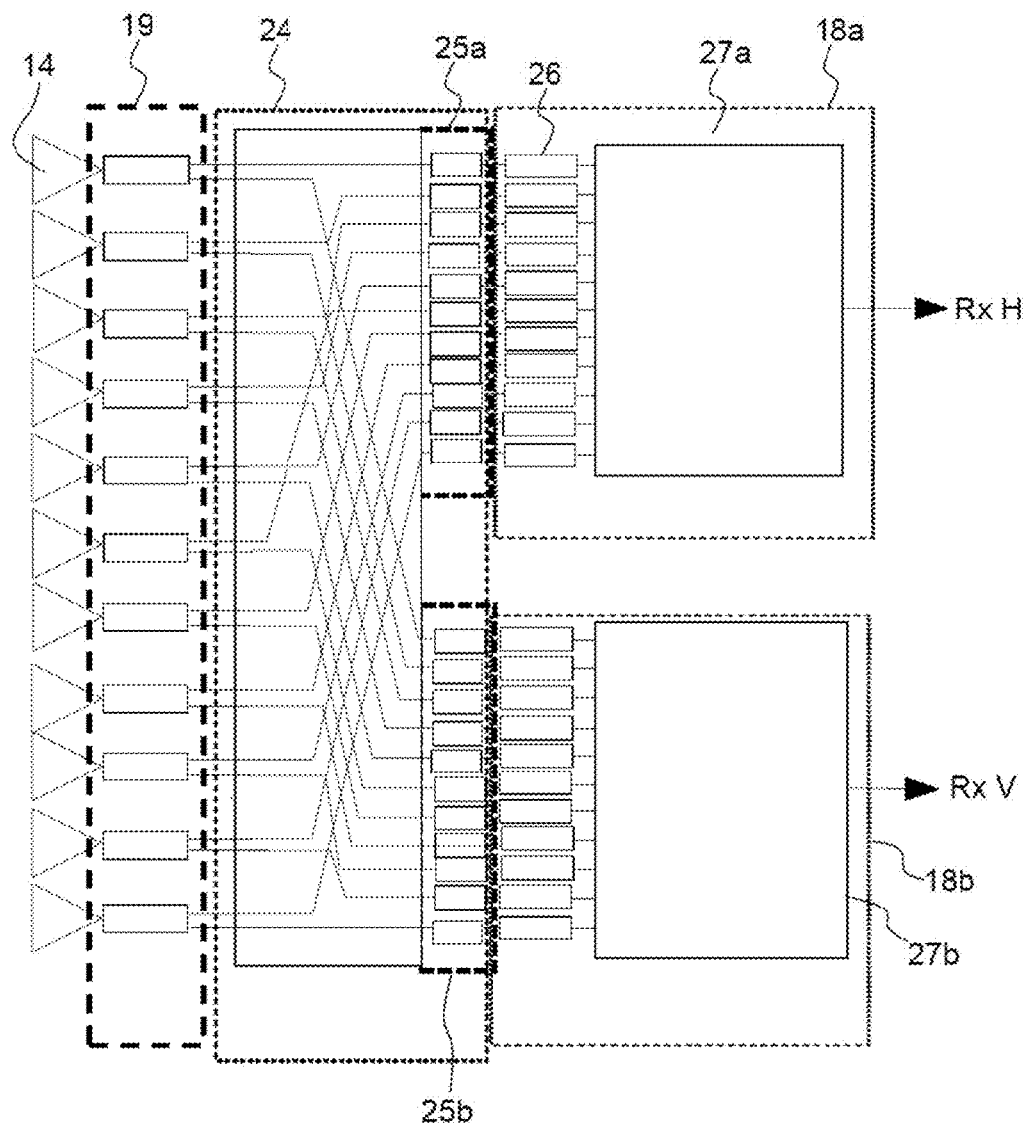
FIG. 4b: a simplified block diagram of the architecture of the reception chain of the secondary radiating array, in the case of beam generated by the application of phase laws only, according to the invention.

FIGS. 2a, 3a and 3c show synoptic views of a first example of a flexible antenna, which is reconfigurable in orbit according to the invention, wherein the antenna comprises a single shaped reflector 10 and a primary radiating feed 11 placed in front of the reflector 10 and designed to radiate a primary beam 15. FIG. 3b shows a synoptic view of a second example of a flexible antenna, which is reconfigurable in orbit according to the invention, wherein the antenna comprises a shaped primary reflector 10, a sub-reflector 35 and a primary radiating feed 11 placed in front of the sub-reflector 35 and designed to generate a primary beam. In the examples illustrated in FIGS. 2a, 3a, 3b and 3c, in order to achieve beam flexibility, the invention involves the association of the primary radiating feed 11 with an adjustment device which is able to modify, in reception mode, the primary beam generated by the primary radiating feed 11 according to requirements. The primary beam may be modified, either partially for certain reception channels, i.e. for certain operating frequencies of the antenna and/or for a given polarization, or completely for the entire reception frequency band. According to the invention, the adjustment device comprises a secondary radiating array 13 composed of a number of elementary radiating feeds 14, a beam-forming network (BFN) 18 connected to the elementary radiating feeds 14, and a coupling device 30 connected to the reception chain of the secondary radiating array 13 and to the primary reception chain of the primary radiating feed 11.

Figure 2B:
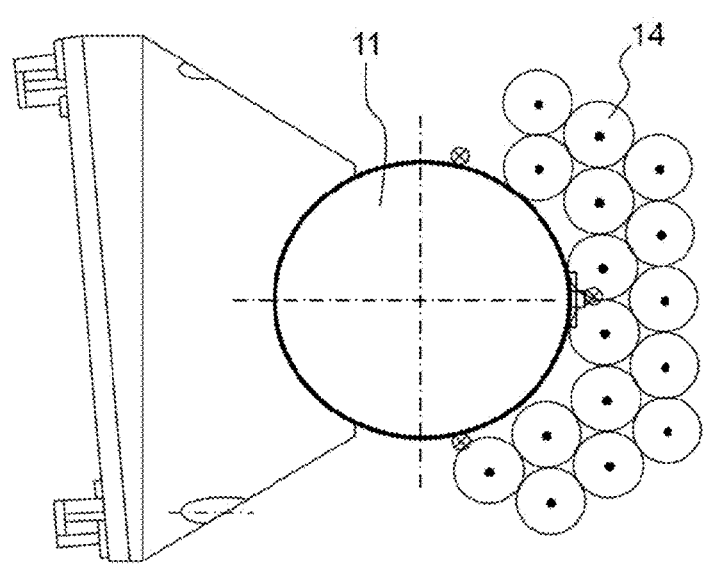
FIG. 2b: a schematic view of an example of the arrangement of feeds in the secondary radiating array, in relation to the primary feed, according to the invention.

As represented in the example of layout shown in FIG. 2b, the elementary radiating feeds 14 of the secondary radiating array 13 are of smaller dimensions compared to the primary radiating feed, are defocused from the focal point of the reflector 10 and are arranged around the primary radiating feed 11. The elementary radiating feeds 14 of the secondary radiating array may be arranged in the focal plane of the reflector 10, but this is not mandatory. The primary radiating feed 11 is composed of a primary radiating element, for example of the horn type, associated with a primary emission and reception chain connected to said primary radiating element, and is designed to generate a fixed primary beam 15 in order to obtain a nominal footprint 12 of a predetermined shape which is not modifiable in orbit, such as the coverage represented by the example shown in FIG. 1 or on the radiation diagram shown in FIG. 5a. As shown, for example, in FIG. 7a, the primary emission and reception chain comprises an exciter 20 for mono-polarization or bi-polarization, for example an orthomode transducer OMT, connected to the radiating element, and one or two diplexers 21, 22 respectively connected to one, or respectively two ports of the OMT. The bi-polarization exciter is designed to deliver two orthogonal polarizations H and V on its two ports, and each diplexer is designed to split the operating frequency bands of the primary radiating feed 11 into two, in order to produce two orthogonally polarized emitter ports TxH, TxV and two orthogonally polarized receiver ports RxH, RxV. Alternatively, if a single polarization mode is required, it is possible to use a one-polarization exciter and a single diplexer. In this case, the primary radiating feed will only be able to operate in a single polarization in both reception and transmission mode.

The secondary radiating array 13 is designed to generate a secondary beam 16, which differs from the primary beam 15, for the coverage of a secondary zone having a flexible secondary footprint 17, 23 which overlaps, at least partially, the nominal footprint 12. The shape of the secondary footprint 17, 23 results from the synthesis of the elementary beams issued from each elementary feeds 14 of the secondary radiating array 13 and reflected by the reflector 10, the elementary footprints of fews elementary beams are illustrated in FIG. 2a by the curves shown by dotted lines 17a, 17b, 17c. The synthesis of the elementary beams is achieved by an adjustment of the phase laws, or of the amplitude and phase laws, applied to said elementary feeds by the beam-forming network BFN 18. As represented in FIGS. 3a, 3b, 3c, 4a, 4b, each elementary feed 14 in the secondary radiating array comprises a radiating element, for example of horn type, connected to an exciter 19, for example an OMT, operating in one-polarization or in bi-polarization mode. In case of operation in bi-polarization mode, each exciter comprises two emitter and receiver ports which are orthogonally polarized in relation to each other, designated as H and V on FIG. 4a. The emitter and receiver ports of the exciters 19 of the elementary radiating feeds 14 are connected to a polarization separation device 24 including the frequency-division diplexers 25a, 25b, thereby permitting the facilitation of the routing of signals issued from the secondary radiating array 13 by the respective separation of the reception channels Rx and the emission channels Tx, originating from all the elementary radiating feeds 14 into two groups corresponding to the two polarizations H and V before transmitting them to the BFN 18. The BFN 18 comprises four identical beam-forming modules 18a, 18b, 18c, 18d, wherein the two beam-forming modules 18a, 18b are respectively dedicated to reception and to the two polarizations H and V, and the other two beam-forming modules 18c, 18d are respectively dedicated to emission and to the two polarizations H and V. The modules of the BFN 18 comprise phase shifters 26 which apply specific laws of phase to the various emission or reception beams routed via the various channels, then respectively transmit the groups of phase-shifted beams corresponding to the two polarizations H and V to power dividers/combiners 27a, 27b. The power dividers/combiners 27a, 27b function either as dividers, in the case of reception, or as combiners, in the case of emission, and distribute the power received between the various receiver ports, or respectively combine the power originating from each emitter port. The BFN 18 may also comprise amplifiers, attenuators and phase-shifters, which act on the amplitude and phase of each emission or reception channel connected to a radiating element, in the interests of the improved generation of beams.

When flexibility requirement is clearly identified and constant over time, the phase laws, or the amplitude and phase laws, delivered by the BFN may be pre-defined and non-modifiable. This applies, for example, when it is necessary to eliminate a jammer, the location of which is well known. When flexibility requirement is susceptible to change over time, for example in the case of unpredictable interference occurs or when an unintentional and unforeseen jammers appear, then it is possible to use an adjustable BFN allowing the modification of the phase laws or the amplitude and phase laws, as represented in FIG. 3c. In this case, a flexible beam may be synthesized by the modification of phase or/and amplitude applied to each secondary radiating feed or, as illustrated in the simplified architecture shown in FIG. 4b, on which only the reception channels are represented, it is also possible to synthesize a flexible beam by the modification of phase laws only, using a simplified BFN in which the secondary beam is obtained by phase setting only. The secondary beam 16 synthesized by the secondary radiating array 13 is directly dependent upon phase, or upon amplitude and phase, applied to each elementary radiating feed by the BFN and is reconfigurable by the modification of said phase, or amplitude and phase.

For the purpose of adjusting phases and/or amplitudes laws applied to each secondary radiating feed, in accordance with requirements, of the radiation diagram of the secondary radiating array and the secondary beam arising therefrom, according to the invention, the phase-shifters 26 may be controlled by an electronic scanning control device 28 linked to an on-board computer 29 on the satellite, as represented for example in FIG. 3c.

In this case, the footprint of the secondary beam 16 covers a secondary coverage zone 17, 23 the shape and dimensions of which are adjustable and modifiable in orbit, in accordance with requirements. The adjustment of the radiation diagram of the secondary radiating array 13, and of the resulting secondary beam 16, is achieved by the beam-forming network (BFN), connected to the input/output ports of the elementary radiating feeds 14 of the secondary radiating array 13 and is modifiable to fulfill requirements, by the modification of phase law and/or amplitude law of the BFN controlled by the electronic scanning control device 28. Specifically, it is then possible to form a secondary radiation diagram for the delivery of maximum and/or minimum energy values in the selected directions, thereby notably permitting the synthesis of a secondary beam, the footprint of which incorporates coverage holes in zones where jammers 6 are located, thereby permitting the elimination of jammed signals in the secondary beam and/or an increase in directivity assigned to selected zones, in order to ensure the generation of a highly directional point-to-point link, or allowing the detection of the jammers positions.

Figure 6:
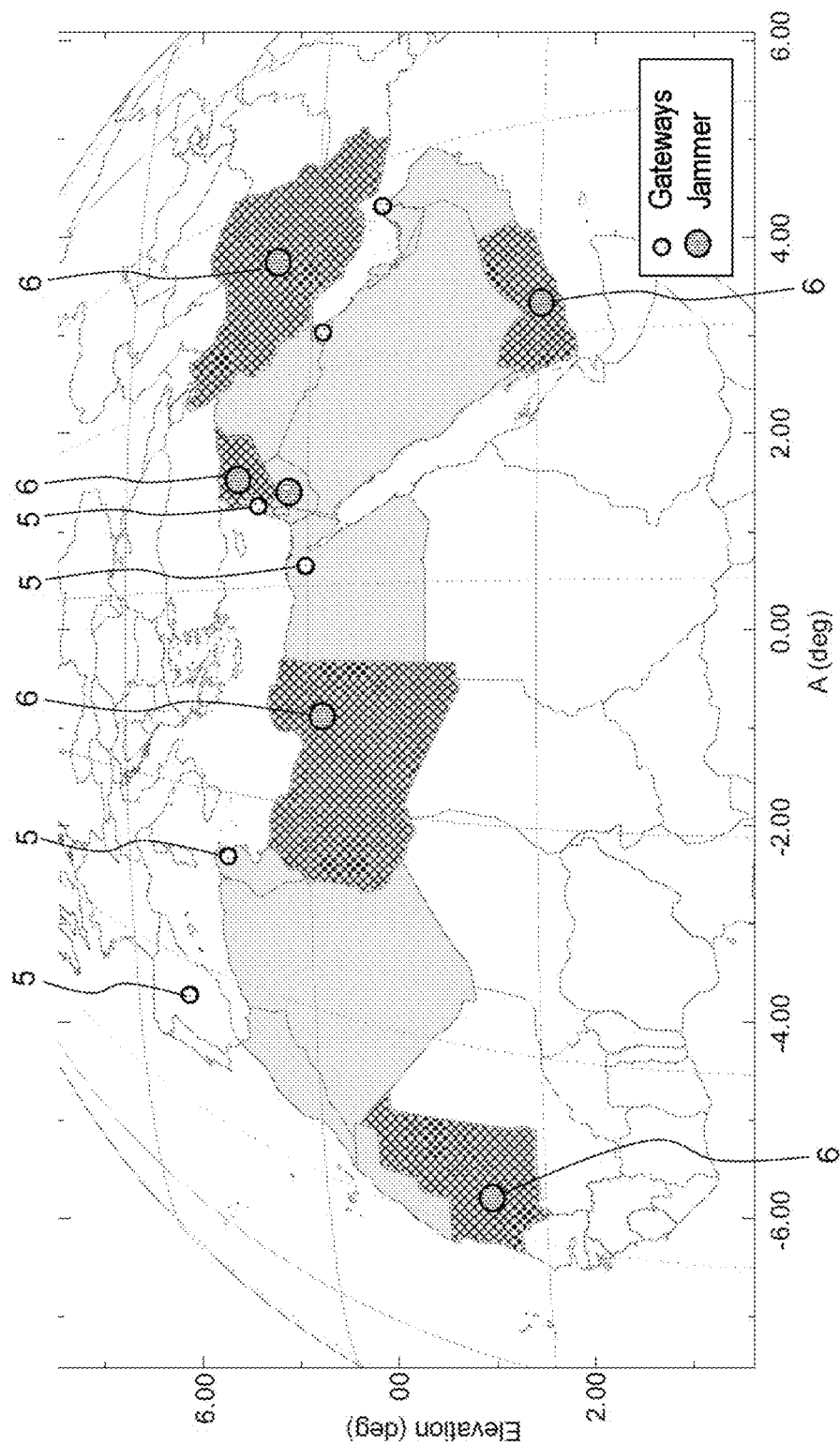
FIG. 6: an example of a scenario illustrating the location of a number of jammers and the location of a number of gateways to be protected against said jammers, according to the invention.

The coupling device 30 is designed, in receiver mode, to isolate an element of the reception frequency bands of the primary feed and to synthesize, for these isolated frequencies, with the secondary radiating array, a beam derived from the synthesis of the elementary beams emitted by each elementary feed 14, having a footprint 17 which differs from the nominal footprint 12. For jammed reception frequency bands, the coupling device 30 may be provided with means for the replacement 31, 33, 32 of the primary reception chain associated with the primary feed 11 with a secondary reception chain associated with the secondary radiating array 13, whereby the replacement means are connected at the output of the beam-forming network. The corresponding architecture of the emitting and receiving antenna which, for one or more frequency bands, ensures the protection of a telecommunication uplink against jammers using the adjustment device according to the invention is represented in the example of embodiment illustrated in FIG. 7a. An example of the location of a number of gateways 5, the telecommunication uplinks of which, from each gateway to the satellite, are to be protected against jammers 6 at different distances from each of the gateways is illustrated in FIG. 6.

In the presence of a jammer 6 in the coverage zone of a gateway 5, the transmission of signals emitted on a downlink from the satellite to the gateways is not jammed and, accordingly, does not require any specific anti-jamming treatment. Consequently, on board the satellite, the emission channels TxH and TxV of the antenna are conventional, and no detailed representation or description thereof will be given. Conversely, upon reception, signals originating from an uplink, from a gateway 5 to the satellite, are disturbed by the presence of a jammer. On FIG. 7a, although only reception frequency bands corresponding to polarization V are provided with anti-jamming protection, it is clearly understood that the corresponding architecture may also be applied to reception frequency bands corresponding to polarization H, if anti-jamming protection for polarization H is required.

In order to ensure the protection of telecommunications against jammers located in the primary coverage zone 12 of the antenna, it is firstly necessary to be able to identify the emission frequency and the geographical position of the jammers 6, and to process the primary reception chains of the antenna in order to ensure continuity of service throughout the full operating frequency band of the antenna. The emission frequency of a jammer 6 is generally known. The geographical position of a jammer 6 may be easily determined using the secondary radiating array 13 of the antenna. In order to detect the jammer, one possible way is to synthesize a series of amplitude and/or of phase laws, each of which will permit the generation of a secondary beam 16, the footprint of which includes a coverage hole in a direction which is liable to contain a jammer, and to apply these laws to the elementary radiating feeds 14 of the secondary radiating array 13, in order to carry out the scanning of zones which are liable to contain a jammer, until such time as the reception channels issued from the secondary radiating array are no longer jammed. The position of each jammer 6 can then be refined by the application of finer variations of the laws of amplitude and of phase around the position detected, and uncertainties can be eliminated by completing the scanning of the coverage zone using a directional radiation diagram which generate a maximum value in one direction.

Where the geographical position and the emission frequencies of the jammer 6 are known, the invention involves, from the primary radiating feed 11, the synthesis of a primary beam 15 covering the primary coverage zone 12 and the synthesis, from the secondary radiating array 13, of a secondary beam 16 covering a secondary coverage zone 17 which is superimposed, at least partially, upon the primary coverage zone 12 and which delivers a minimum gain value in the direction of the jammer 6, thereby corresponding to the formation of a coverage hole in the footprint at the location of the jammer. In reception mode, the invention then involves, in the primary reception chain connected to the primary radiating feed 11, the deletion of jammed operating frequencies and, in the reception chain of the secondary radiating array 13, the selection only of those operating frequencies which correspond to the deleted frequencies in the primary reception chain. The invention then involves, in the coupling device 30, the replacement of the deleted frequencies in the primary reception chain with the frequencies selected in the secondary reception chain, by the multiplexing of the primary and secondary reception inputs of the primary and secondary reception chains respectively, such that the operating frequency band of the primary reception channels is entirely reconstituted. The deletion of jammed frequencies is achieved, in the coupling device 30, by means of a selective-rejection band-stop filter 33 connected to the reception chain associated with the primary radiating feed 11. The selection of operating frequencies is achieved, within the coupling device 30, by means of a selective band-pass filter 31 connected to the reception chain associated with the secondary radiating array 13, whereby the band-pass filter 31 is arranged at the output of the BFN 18. The rejection band-stop filter and the band-pass filter are centered on frequencies corresponding to the emission frequencies of the jammer, or of the jammers. The replacement of deleted frequencies in the primary reception chain with frequencies selected from the secondary reception chain is then achieved, within the coupling device 30, by means of a dual multiplexer 32 connected to the rejection band-stop filter 33 for the primary reception frequency bands and to the band-pass filter 31 for the secondary reception frequency bands. The dual multiplexer is designed for the multiplexing of the primary and secondary reception frequency bands originating from the primary radiating feed and from the secondary radiating array, in order to reconstitute a complete and non-jammed operating frequency band prior to the relay of telecommunications, in the emission frequency band, to end users. This permits the complete reconstitution of the operating frequency band of the primary radiating feed 11 of the antenna, and ensures the non-jammed relay of telecommunications issued from gateways, for all operating frequencies of the antenna. This architecture therefore permits the protection of uplinks operating in certain frequency bands, without affecting the remaining uplinks in other frequency bands and without impairing the performance of the antenna in said other frequency bands. If the jammer levels are sufficiently low to prevent the saturation of the input stage of the frequency converter 38, the selective filters 33 and 31 may be replaced by band-pass filters covering the entire reception frequency band Rx. The elimination of jammed frequency bands from the primary reception chain and the substitution thereof by corresponding frequency bands in the non-jammed secondary reception chain are then achieved by the dual multiplexer 32, in order to reconstitute a complete and non-jammed operating frequency band.

Figure 7A:
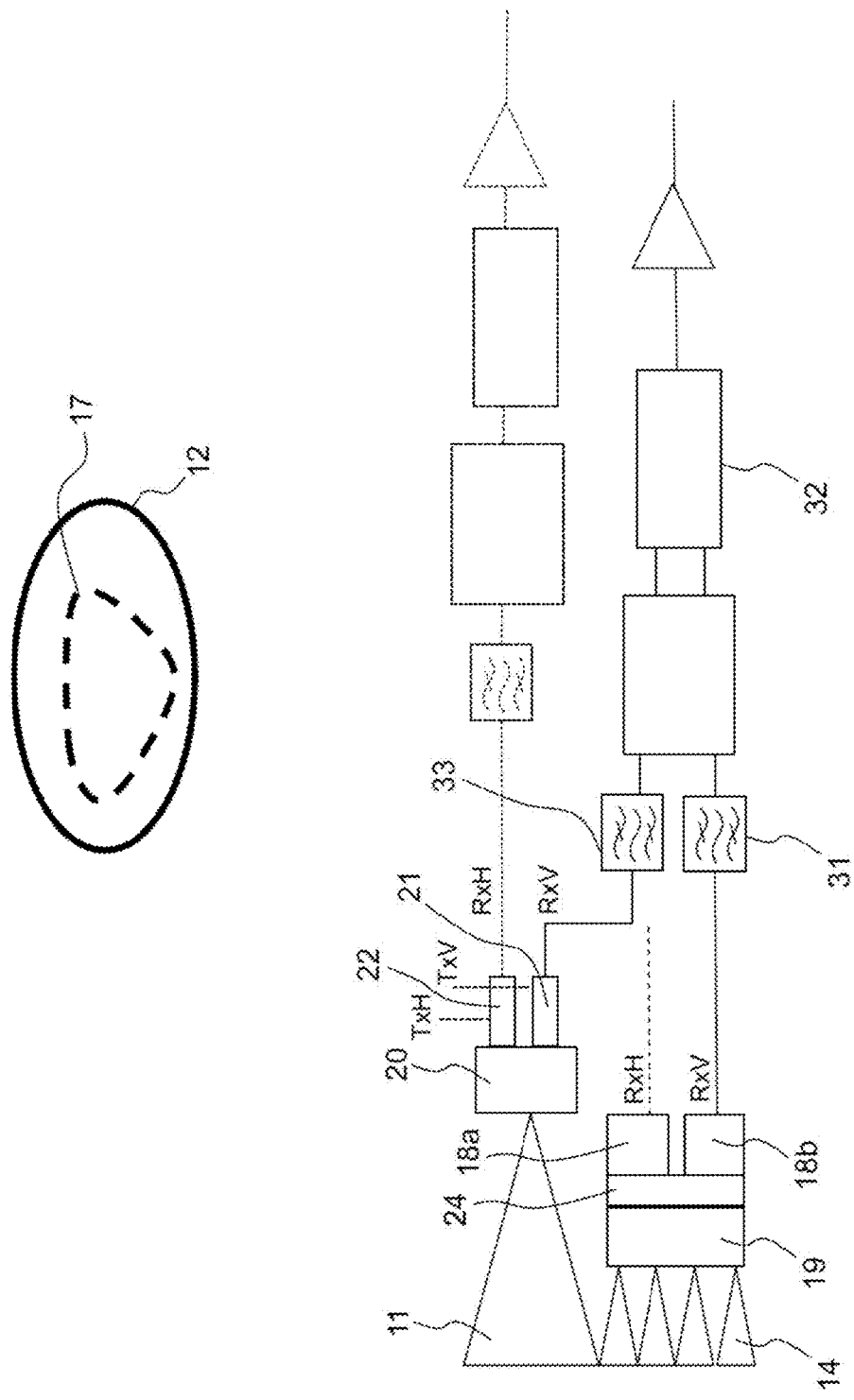
FIG. 7a: a block diagram of a first example of the architecture of an antenna comprising an adjustment device for adjusting the primary beam which ensures the protection of gateways, in a number of channels corresponding to a predetermined frequency band, against jammers located in the primary coverage zone of the antenna, according to the invention.
Figure 7B:
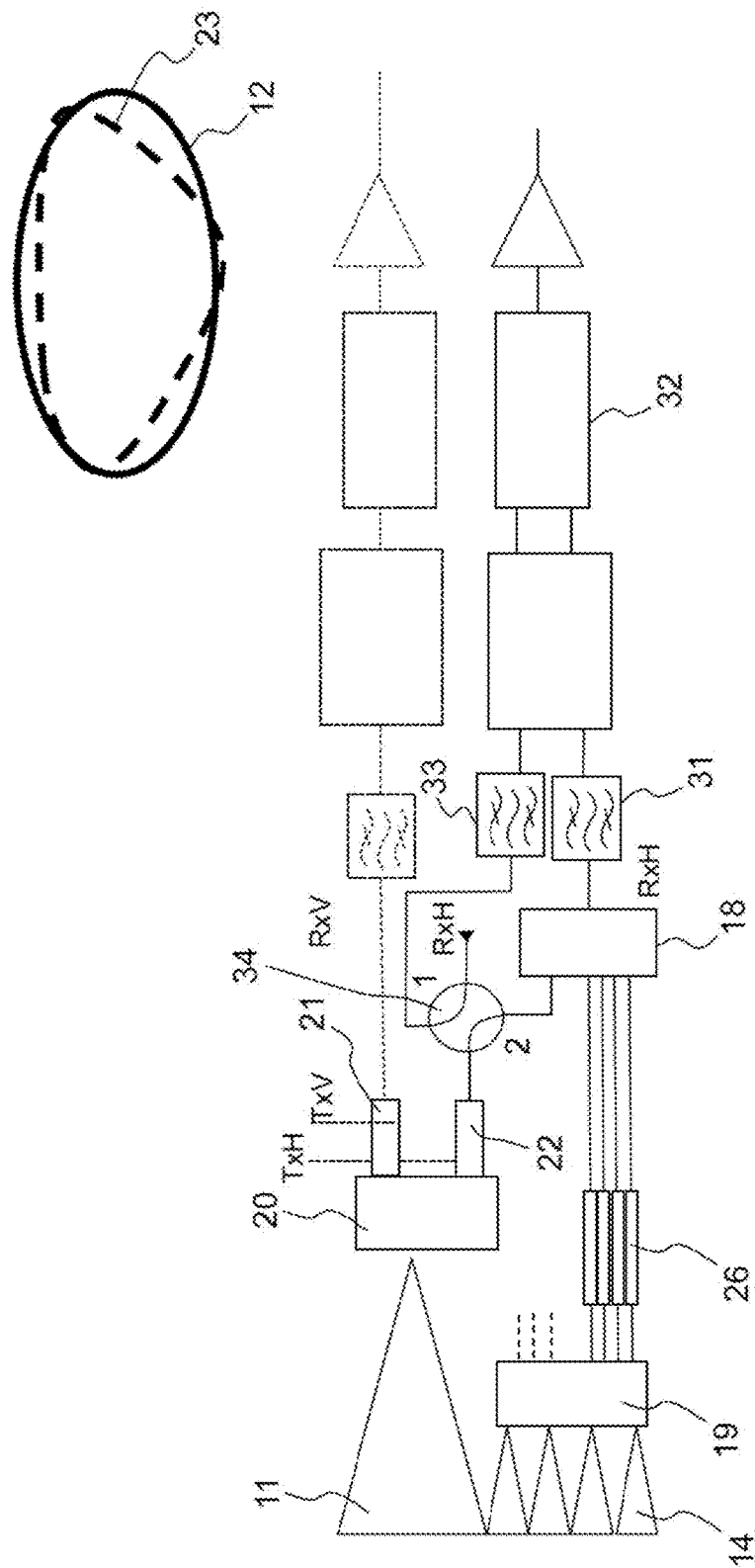
FIG. 7b: a block diagram of a second example of the architecture of an antenna comprising an adjustment device for adjusting the primary beam which ensures the protection of gateways against jammers located in the primary coverage zone of the antenna, according to the invention.
Figure 7D:
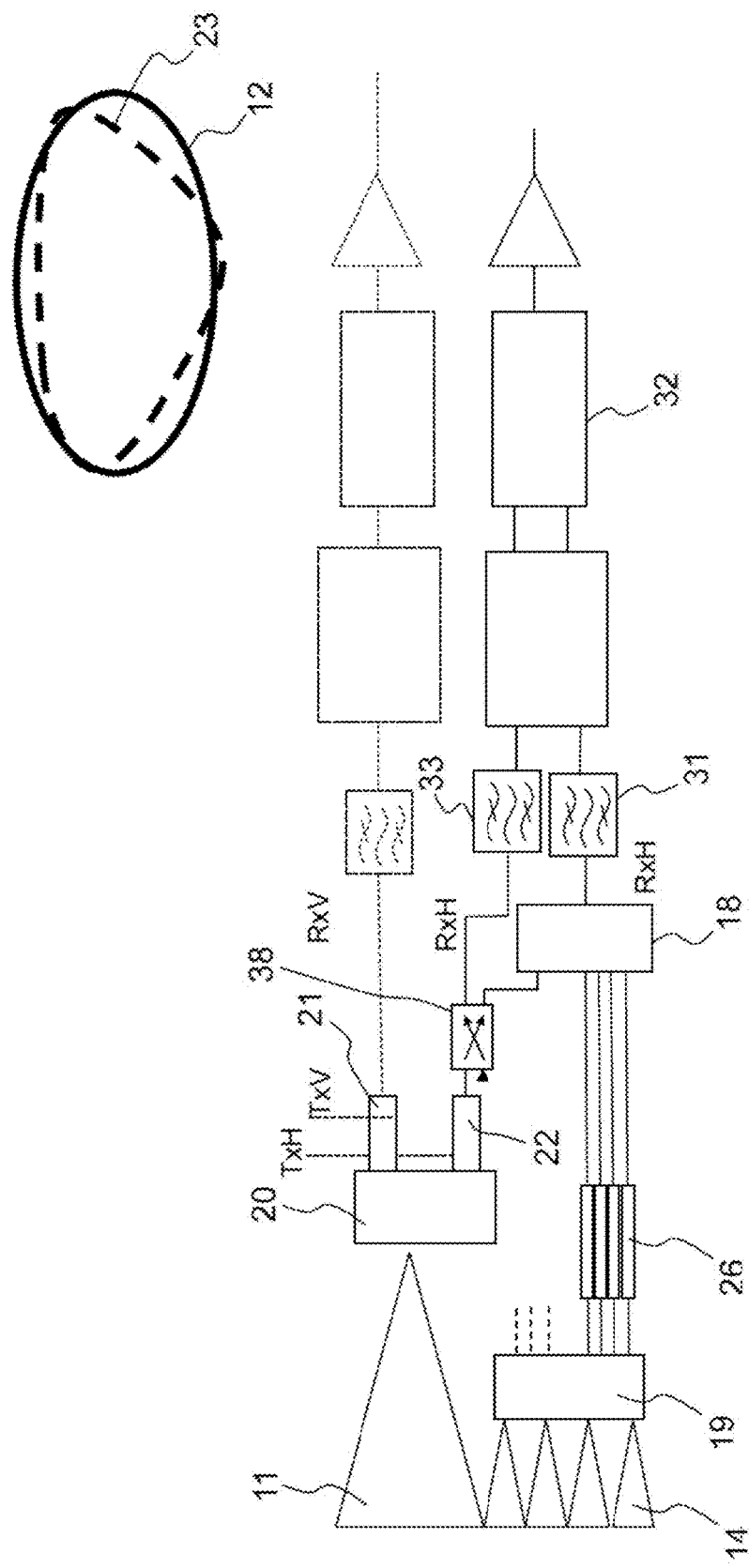
FIG. 7d: a diagram for a variant in the execution of the architecture of the antenna shown in FIG. 7b, according to the invention.

FIG. 7b represents a second example of the architecture of an emitting and receiving antenna according to the invention, for the protection of a telecommunication uplink against the risk of jamming. Although, in this example, the coupling device 30 is connected to the reception chain corresponding to polarization H, it may naturally also be connected to the reception chain corresponding to polarization V. The coupling device 30 comprises a switch 34 with two positions 1, 2, having an input connected to the primary radiating feed 11, a first output position 1 connected to the primary reception chain and a second output position 2 connected to the secondary reception chain via an input on the BFN 18. Alternatively, as represented in FIG. 7d, the switch 34 may be replaced by a coupler 38 which comprises an input connected to the primary radiating feed 11, a first output connected to the primary reception chain, and a second output connected to an input of the beam-forming network (BFN) 18. The coupler may be a fixed coupler, depending upon the requirement for flexibility and level of jammer suppression capability, or a variable coupler of the VPD (variable power divider) type, including a capacity of coupling coefficient adjustment. The entire reception frequency band of the secondary radiating array 13, corresponding to at least one polarization, for example to polarization H, is routed via the secondary reception chain on the input side of the beam-forming network (BFN) 18. At the input of the BFN 18, the reception chain associated with the secondary array may also comprise a phase adaptation section 26 in order to offset the difference in routing between the primary reception chain and the secondary reception chain associated with the secondary array, thereby constituting a single and unique reception chain for the entire operating frequency band. It is also possible to connect the primary reception chain corresponding to the polarization V on the input side of the beam-forming network (BFN) 18 via the switch 34 with two positions 1, 2 or the coupler 38. Depending upon the position of the switch 34, or upon the coupling coefficient of the coupler 38, the radiation diagram of the antenna is either the primary beam 15, delivered by the primary feed 11 and having a footprint 12, or a combined beam delivered at the output of the beam-forming network (BFN) 18 and having a footprint 23. The BFN 18 adjusts the phase and/or of amplitude for each elementary radiating feed 14 in relation to the primary radiating feed 11, in order to obtain maximum and minimum energy values in the selected directions, in accordance with requirements. In the presence of a jammer, the location of which is known, a minimum gain value may then be synthesized in the direction of the jammer. This architecture affects the entire reception frequency band operating with a given polarization, without modifying the reception channels of the other polarization. It permits the protection of satellite telecommunications against any intentional or unintentional jammer, permits an increase in the gain of communication links in the direction of the gateways, and permits the formation of coverage holes in zones where a high risk of jamming is foreseen. The architecture illustrated in FIG. 7b delivers higher levels of rejection and permits the achievement of higher maximum values by the generation of beams with larger footprints than those obtained by the architecture described in conjunction with FIG. 7a although, conversely, this architecture does not, for a given polarization, permit the selection of a number of reception frequency bands, nor of part of a reception frequency band. The radiation diagram obtained using this architecture in the scenario described in FIG. 6 is illustrated by the diagram in FIG. 8b.

FIG. 7c represents a third example of the architecture of an emitting and receiving antenna according to the invention, for the protection of a telecommunication uplink against all risks of jamming, with a dynamic adjustment capability, for all reception channels operating with a given polarization H or V, by the modification of the primary beam of the antenna using the adjustment device according to the invention. In this example, all the reception channels of the secondary radiating array 13 corresponding to the polarization H are connected on the input side of the beam-forming network 18. At the input of the BFN 18, the reception chain associated with the secondary array may also comprise a phase adaptation section 26 in order to offset the difference in routing between the primary reception chain and the secondary reception chain derived from with the secondary array. The beam-forming network (BFN) 18 adjusts phase and/or of amplitude of each elementary radiating feed 14 in order to obtain maximum and minimum gain values in the selected directions, in accordance with requirements. The coupling device 30 connected to the reception chain of the primary feed 11 and on the output side of the BFN comprises a coupler 37 which, at the output of the BFN 18, combines the reception chain of the secondary array with the reception chain of the primary feed 11 to form a composite beam which ensure the flexible coverage zone 23. This architecture permits the adjustment of the primary beam of the antenna, in reception mode, in accordance with risks of jamming and on a continuous basis, by the reduction or rejection of jammed zones, thereby eliminating any risk of intentional or unintentional jamming, without interrupting communications. The architecture illustrated in FIG. 7c permits the adjustment of the radiation diagram of the antenna on a continuous basis. The diagram obtained using this architecture, in the case of the scenario described in FIG. 6, is illustrated in FIG. 8c.

Figure 8A:
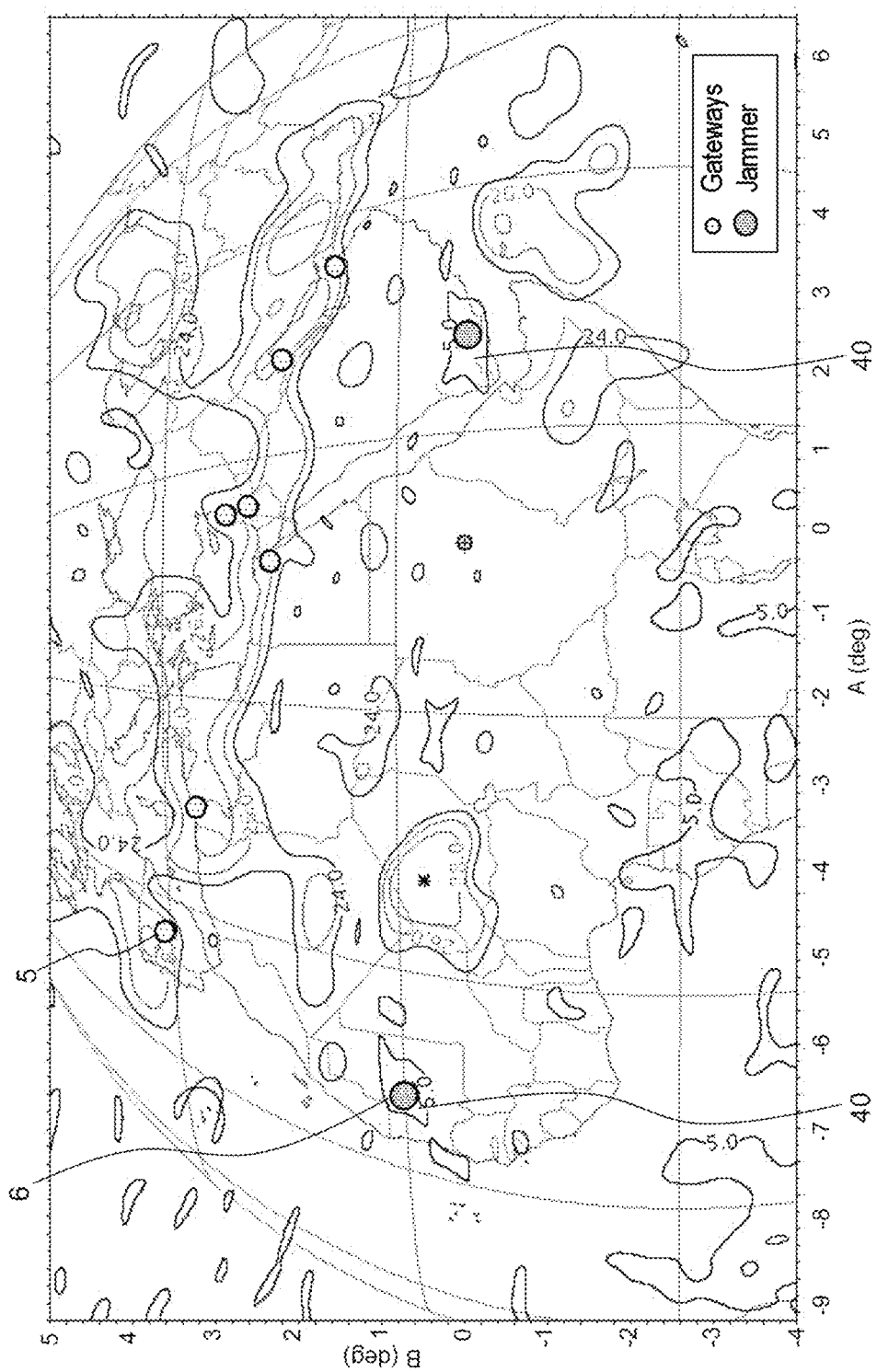
FIGS. 8a, 8b, 8c: three examples of modified primary radiation diagrams, produced respectively using the architectures shown in FIGS. 7a, 7b, 7c, according to the invention.
Figure 8B:
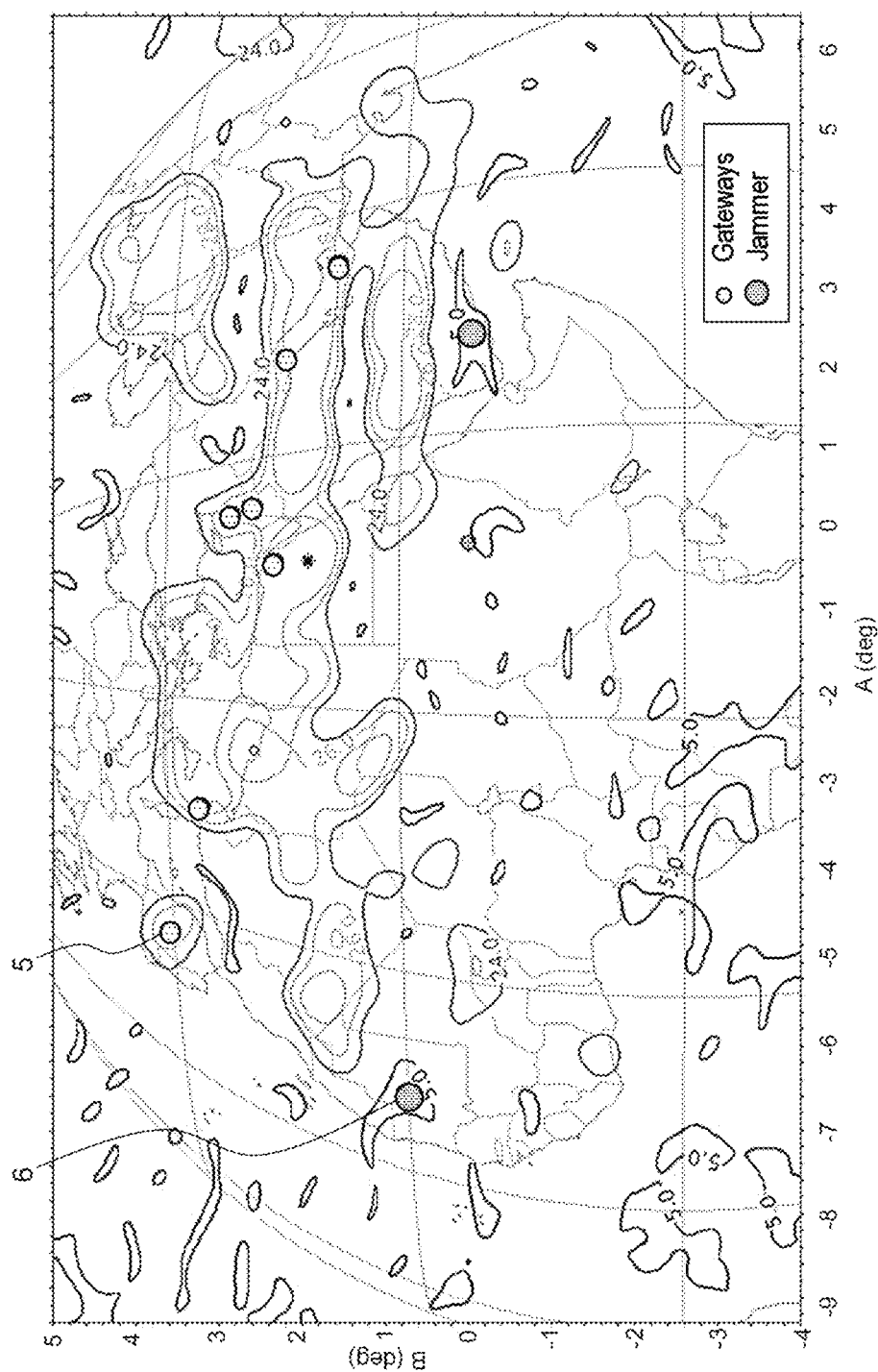
Figure 8C:
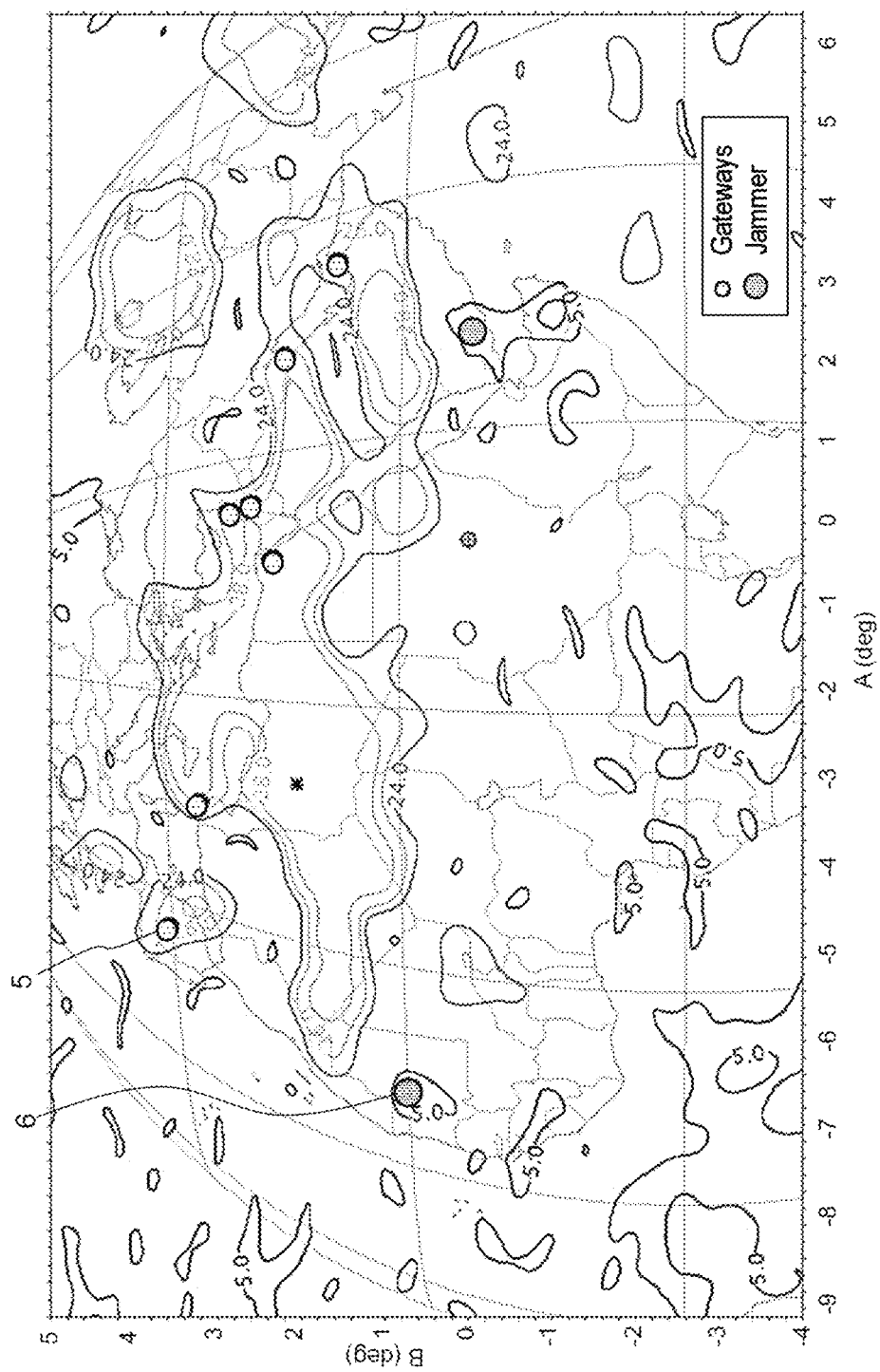

FIGS. 8a, 8b, 8c illustrate three examples of radiation diagrams, i.e. footprints, corresponding to the primary beam modified by the secondary array of the antenna, and obtained respectively by the architectures shown in FIGS. 7a, 7b and 7c for the scenario illustrated in FIG. 6. For FIG. 8c, the coupler used is a fixed coupler, in accordance with the requirement for flexibility and rejection. Alternatively, the fixed coupler may be replaced by a variable coupler of the VPD (variable power divider) type, incorporating a capability for the adjustment of the coupling coefficient. FIGS. 8a, 8b, 8c show that the gateways 5 are situated in a coverage zone of the antenna where the radiation of the primary beam, modified by the secondary radiating array of the antenna, has a maximum directivity of the order of 26 dBi, whereas the jammers 6 are situated in coverage holes 40 where the radiation of the modified primary beam has a directivity of the order of 5 dBi, and is therefore significantly lower than the maximum directivity.

Although the invention has been described with reference to specific modes of embodiment, it is evident that it is by no means restricted thereto, and includes all technical equivalents of the means described, and combinations thereof, where the latter fall within the scope of the invention.

The invention claimed is:

1. An emitting and receiving antenna for a telecommunications satellite, said antenna comprising:
   at least one shaped reflector;
   a primary radiating feed having a primary reception chain, said primary radiating feed configured to generate a fixed primary beam with a nominal footprint; and
   an adjustment device configured to adjust the primary beam, wherein said adjustment device comprises:
      a secondary radiating array comprising a number of elementary radiating feeds accommodated around the primary radiating feed,
      a beam-forming network connected to the elementary radiating feeds and configured to synthesize a secondary beam having a minimum energy value in a direction of a jammer and having a footprint which is superimposed, at least partially, upon the nominal footprint, and
      a coupling device distinct from the beam-forming network, the coupling device comprising:
         a first input connected to the primary reception chain of the primary radiating feed,
         a second input connected to a reception chain of the secondary radiating array,
         a first filter having an input connected to the primary radiating feed,
         a second filter having an input connected on an output of the beam-forming network, and
         a dual multiplexer comprising two inputs connected to respective outputs of the first filter and the second filter, wherein the dual multiplexer is configured to multiplex reception frequency bands of the primary radiating feed and the secondary radiating array in order to reconstitute a complete and non-jammed reception frequency band.

2. An antenna according to claim 1, wherein the first filter comprises a selective band-stop filter, and the second filter comprises a selective band-pass filter, the selective band-stop filter and the selective band-pass filter being centered on frequencies corresponding to emission frequencies of a jammer.

3. The antenna according to claim 1, wherein the first filter and the second filter are band-pass filters covering a totality of a reception frequency band of the antenna.

4. The antenna according to claim 1, wherein the coupling device further comprises a switch having an input connected to the primary radiating feed, said switch comprising a first output position connected to the primary reception chain and a second output position connected to an input of the beam-forming network.

5. The antenna according to claim 1, wherein the coupling device further comprises a coupler having an input connected to the primary radiating feed, said coupler comprising a first output connected to the primary reception chain and a second output connected to an input of the beam-forming network.

6. The antenna according to claim 5, wherein the coupler comprises a variable power divider.

7. The antenna according to claim 1, further comprising an electronic scanning control device linked to an on-board computer, said electronic scanning control device being connected to the beam-forming network.

* * * * *